(12) United States Patent
Beller et al.

(10) Patent No.: US 10,943,117 B2
(45) Date of Patent: *Mar. 9, 2021

(54) TRANSLATION TO BRAILLE

(71) Applicant: International Business Machines Corporation, Armonk, NY (US)

(72) Inventors: Charles E. Beller, Baltimore, MD (US); Shaila Pervin, Docklands (AU); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,596

(22) Filed: Jul. 8, 2019

(65) Prior Publication Data

US 2020/0272819 A1    Aug. 27, 2020

Related U.S. Application Data

(63) Continuation of application No. 16/283,036, filed on Feb. 22, 2019.

(51) Int. Cl.
| | | |
|---|---|---|
| *G06K 9/00* | (2006.01) | |
| *B41J 3/32* | (2006.01) | |
| *G06F 1/16* | (2006.01) | |
| *G09B 21/00* | (2006.01) | |

(52) U.S. Cl.
CPC ............ *G06K 9/00664* (2013.01); *B41J 3/32* (2013.01); *G06F 1/163* (2013.01); *G09B 21/003* (2013.01)

(58) Field of Classification Search
CPC .. G06K 9/00664; G06K 9/00671; G06K 9/22; B41J 3/32; G06F 1/163; G06F 16/583; G06F 16/955; G09B 21/003; G09B 21/005; G09B 21/008; G09B 5/125; A61F 9/08; A61H 2201/0157; A61H 2201/501; A61H 2201/5048; A61H 2201/5092; A61H 3/061; H04M 1/72594

See application file for complete search history.

(56) References Cited

U.S. PATENT DOCUMENTS

| | | |
|---|---|---|
| 3,594,787 A | 7/1971 | Ickes |
| 7,817,855 B2 | 10/2010 | Yuille |

(Continued)

OTHER PUBLICATIONS

Matusiak et al., "Object Recognition in a Mobile Phone Application for Visually Impaired Users," IEEE, 2013 6th International Conference on Human System Interactions (HSI), Sopot, Jun. 6-8, 2013, pp. 479-484.*

(Continued)

*Primary Examiner* — Mohammed S Rahaman
(74) *Attorney, Agent, or Firm* — Brian D. Welle

(57) ABSTRACT

A structured description is generated for a digital image of a scene. The structured description may include a first feature and a second feature of the scene. The structured description may also include a first detail of the first feature and a second detail of the second feature. A portable braille sequence printer may generate braille text of the first and second features using the structured description. The portable braille sequence printer may further generate additional braille text regarding the first detail in response to a prompt from the user regarding the first feature.

10 Claims, 3 Drawing Sheets

(56) References Cited

U.S. PATENT DOCUMENTS

| | | | | |
|---|---|---|---|---|
| 8,370,869 | B2* | 2/2013 | Paek | G06K 9/00711 |
| | | | | 725/19 |
| 9,691,300 | B2 | 6/2017 | Wong | |
| 2005/0208457 | A1 | 9/2005 | Fink | |
| 2007/0279521 | A1 | 12/2007 | Cohen | |
| 2008/0058894 | A1* | 3/2008 | Dewhurst | G09B 21/007 |
| | | | | 607/54 |
| 2008/0286025 | A1* | 11/2008 | Wright | B41J 3/32 |
| | | | | 400/88 |
| 2010/0027765 | A1* | 2/2010 | Schultz | H04M 3/42391 |
| | | | | 379/52 |
| 2012/0094257 | A1 | 4/2012 | Pillischer | |
| 2012/0212593 | A1* | 8/2012 | Na'aman | G06K 9/00671 |
| | | | | 348/62 |
| 2015/0332607 | A1* | 11/2015 | Gardner, Jr. | G09B 21/003 |
| | | | | 434/114 |

OTHER PUBLICATIONS

Ian et al., "Toward a Computer Vision-based Wayfinding Aid for Blind Persons to Access Unfamiliar Indoor Environments," National Institute of Health, Machine Vision & Applications, Apr. 2013, 24(3), pp. 1-31.*

Zhong et al., "RegionSpeak: Quick Comprehensive Spatial Descriptions of Complex Images for Blind Users," Association for Computing Machinery (ACM), New York, NY, USA, Apr. 18-23, 2015, 10 pages.*

Yoshida et al., "EdgeSonic: Image Feature Sonification for the Visually Impaired," In Proceedings of the 2nd Augmented Human International Conference (AH '11). Association for Computing Machinery (ACM), New York, NY, USA, Article 11, 4 pages.*

Allison, "Dot's Braille Smartwatch Will Finally Ship to Buyers After Delays," Wearable.com, Feb. 22, 2017, 2 pages. <https://www.wareable.com/wearable-tech/dot-is-a-wearable-for-the-visually-impaired-1441>.

Beller et al., "Translation to Braille," U.S. Appl. No. 16/283,036, filed Feb. 22, 2019.

Buscher et al., "Flexible and Stretchable Fabric-Based Tactile Sensor," Robotics and Autonomous Systems, vol. 63, 2015, pp. 244-252. <https://www.sciencedirect.com/science/article/pii/S0921889014001821>.

Goto et al., "Text-Tracking Wearable Camera System for the Blind," 2009 10th International Conference on Document Analysis and Recognition, Barcelona, 2009, pp. 141-145.

Hianif et al., "Texture Based Text Detection in Natural Scene Images: A Help to Blind and Visually Impaired Persons," Conference & Workshop on Assistive Technologies for People with Vision & Hearing Impairments: Assistive Technology for All Ages, CVHI 2007, Granada, Spain, Aug. 28-31, 2007, 6 pages.

List of IBM Patents or Patent Applications Treated as Related, Jul. 5, 2019, 2 pages.

Tian et al., "Toward a Computer Vision-based Wayfinding Aid for Blind Persons to Access Unfamiliar Indoor Environments," National Institute of Health, Machine Vision & Applications, Apr. 2013, 24(3), pp. 1-31. <https://doi.org/10.1007/s00138-012-0431-7>.

Wu et al., "Automatic Alt-text: Computer-generated Image Descriptions for Blind Users on a Social Network Service," Association for Computing Machinery (ACM), New York, NY, USA, Mar. 25, 2017, 13 pages. <https://research.fb.com/wp-content/uploads/2017/02/aat_cscw2017_camera_ready_20161031-2.pdf>.

Zhong et al., "RegionSpeak: Quick Comprehensive Spatial Descriptions of Complex Images for Blind Users," Association for Computing Machinery (ACM), New York, NY, USA, Apr. 18-23, 2015, 10 pages. <http://web.eecs.umich.edu/~wlasecki/pubs/regionspeak.pdf>.

* cited by examiner

TRANSLATION TO BRAILLE

BACKGROUND

The field of image processing is growing with the ubiquity of cameras in modern devices. Computing systems are becoming increasingly powerful and adept at detecting and properly identifying shapes of both still images and video data. As such, computing systems are becoming increasingly capable of visually identifying elements of an environment. For example, self-driving cars and the like often rely heavily on visual identification of information to determine where and when and how to interact.

SUMMARY

Aspects of the present disclosure relate to systems and methods of generating structured descriptions of a scene to translate the scene to braille. A digital image of a scene is received by a processor. The processor generates a structured description of the scene utilizing image recognition techniques on the digital image. The structured description includes a first feature and a second feature of the scene. The structured description also includes a first detail of the first feature and a second detail of the second feature. A portable braille sequence printer generates braille text of the first and second features using the structured description. The portable braille sequence printer generates additional braille text regarding the first detail in response to a prompt from the user regarding the first feature.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
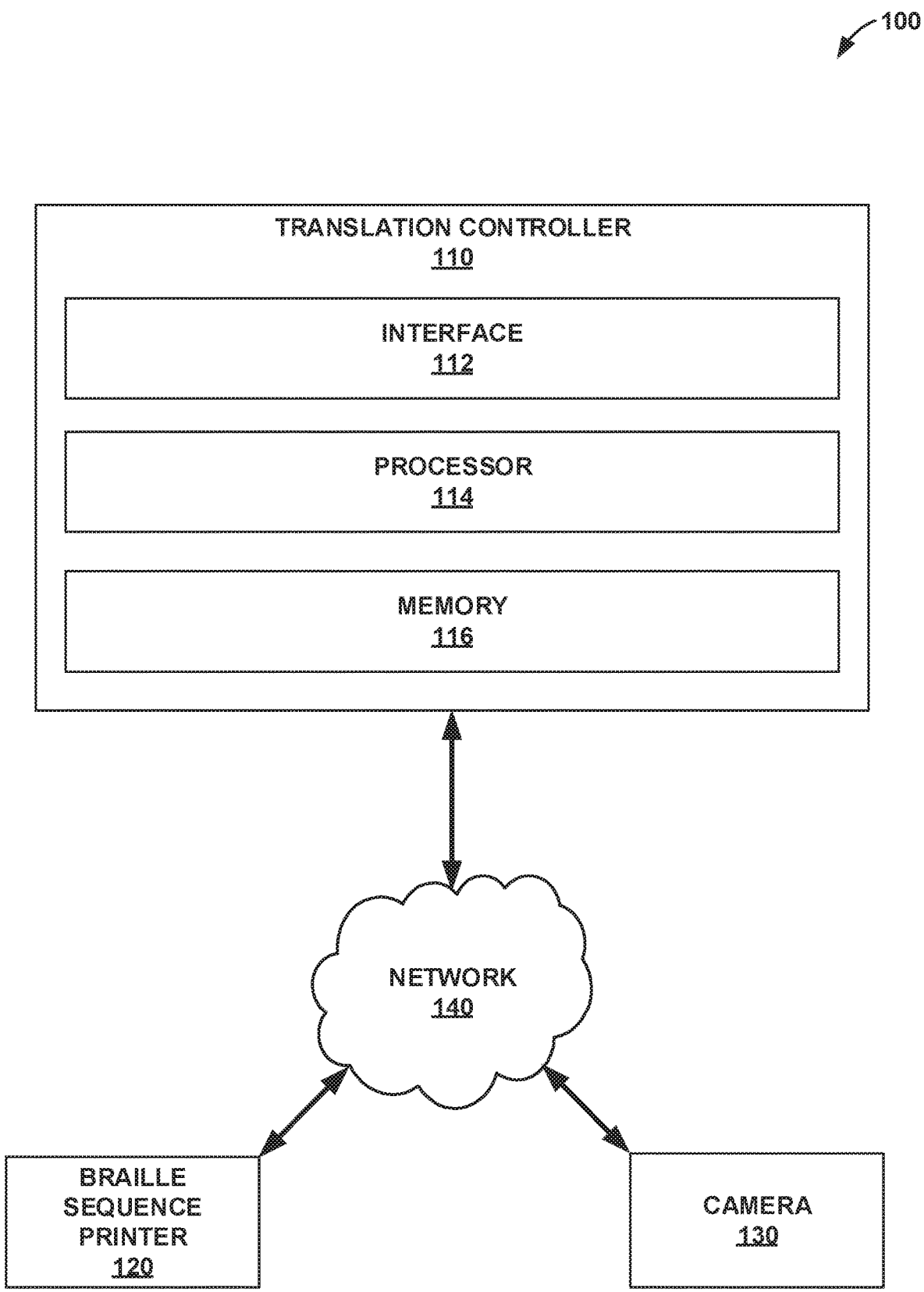
FIG. 1 depicts a conceptual and schematic block diagram of an example system that is configured to translate scenes to braille by creating a structured description of the scene.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to translating a scene to braille, and more particular aspects relate to generating a structured description of a scene to facilitate translating a scene as captured by a digital image to braille. For example, aspects of the disclosure may relate to systems and methods for autonomously translating a scene from a digital image to braille text, and therein transmitting the braille text to a mobile and/or wearable device that is configured to create the braille text in a tactile format for a user. While the present disclosure is not necessarily limited to such applications, various aspects of the disclosure may be appreciated through a discussion of various examples using this context.

In some examples, aspects of the disclosure may begin a process of translating a scene to braille by taking a photograph (e.g., a digital image) of the scene. As used herein, a scene is a real-world setting that includes visual information that may be of use to a person (e.g., a visually-impaired person). Once a digital image is created, a translation controller (e.g., a computing system that includes a processor as described below with respect to FIG. 1) may analyze the scene as captured by the digital image. The translation controller may analyze the digital image to identify features of the scene, where features may include things such as signs, stores, vehicles, people, animals, physical impediments such as posts or bodies of water, or the like.

Once the translation controller identifies these features, the translation controller may generate a structured description of the scene. The translation controller may generate the structured description to be stored at least partially in a text format (e.g., where the structured description is at least partially stored in a natural language format). The structured description may organize the structured description by feature (e.g., with a pointer or tag for each feature), where each feature has further information (e.g., a detailed description of each feature as stored in natural language format) that is linked (e.g., embedded) to the respective feature. Further, as described herein, the translation controller may organize features into a natural language phrase to construct a caption or overview of the scene. As used herein, a structured description of a scene may include an electronic construct of data regarding that scene, where primary features are "tagged" as such and organized into a natural language phrase or sentence that generally describes the scene but are also connected to specific details of the respective features.

A braille sequence printer may use the structured description to generate a tactile message in braille for a user regarding the scene. The braille sequence printer may be a device that is configured to generate a plurality of braille characters for a user. The braille sequence printer may be configured to generate the characters as an "emboss" that extends out from a relatively flat surface of the braille sequence printer. The braille sequence printer may be configured to generate a sequence (e.g., an ordered set) of braille characters that spell out a message. The braille sequence printer may include a plurality of generating elements such as pins or dowels or the like that extend from the flat surface to define the generated braille characters. The generating elements may be configured to extend out from the surface or lie flat against the surface to generate the braille characters as controlled by a processor as described herein. In some examples, the braille sequence printer may be portable. For example, the braille sequence printer may be either configured to be handheld (e.g., being both light enough and small enough to be handled comfortably by an average adult) or may be integrated into a wearable device such as a glove or a sleeve.

For example, the braille sequence printer may generate an overview of the scene and a list of the features of the scene. In some examples, the braille sequence printer may generate the overview by listing each of the features together in a sentence or phrase in a natural language format. The user may provide a prompt or request regarding one or more of the features, in response to which the braille sequence printer may provide the additional details on the features. In some examples, the braille sequence printer may be remote from the translation controller (e.g., where the translation controller includes a processor that is within a separate housing than the braille sequence printer), such that the braille sequence printer may receive a message from the translation controller regarding the structured description and/or any follow up prompts. By using a structured description with structured layers of information to provide a closed loop that includes user feedback between a braille sequence printer and a translation controller, aspects of this disclosure may increase an ability to provide accurate, relevant, and/or desired information to a user in braille format regarding a scene.

FIG. 1 depicts a conceptual block diagram of system 100 that is configured to translate a scene to braille using a structured description. The specific arrangement of components of system 100 are depicted for purposes of illustration only, as in other examples system 100 may include more or less components, or similar components that are integrated into each other. System 100 may include translation controller 110. Translation controller 110 may be a portable computing device, such as a smartphone or another form of a handheld computing device. In some examples, translation controller 110 may be integrated into a wearable device, such as a pair of smart glasses or a smart watch. In certain examples, translation controller 110 may be integrated into a mobile device such as a walking cane or the like.

Translation controller 110 may include interface 112, processor 114, and memory 116. Translation controller 110 may include any number or amount of interface 112, processor 114, and memory 116. Interface 112 may be configured to enable translation controller 110 to communicate with (e.g., send data to and receive and utilize data transmitted by) devices that are external to translation controller 110. For example, interface 112 may be configured to enable components of translation controller 110 to communicate with, e.g., braille sequence printer 120 and/or camera 130. In some examples, interface 112 may include a service data objects framework to ensure that components of translation controller 110 are accessed in a uniform manner. Interface 112 may include one or more network interface cards, such as Ethernet cards, and/or any other types of interface devices that can send and receive information. Any suitable number of interfaces may be used to perform the described functions according to particular needs.

Translation controller 110 is configured to generate a structured description of a scene. Translation controller 110 may utilize processor 114 to generate a structured description of a scene. Processor 114 may include, for example, microprocessors, digital signal processors (DSPs), application specific integrated circuits (ASICs), field-programmable gate arrays (FPGAs), and/or equivalent discrete or integrated logic circuit. Two or more of processor 114 may be configured to work together to generate a structured description of a scene. For example, though only one processor 114 is depicted in translation controller 110 for purposes of clarity, in some examples, more than one of processor 114 across translation controller 110, braille sequence printer 120, and/or camera 130 may work together to generate a structured description of a scene as described herein.

Processor 114 may generate a structured description of a scene according to scene translation instructions 118 stored on memory 116 of translation controller 110. For example, actions attributed to translation controller 110 within this disclosure may be executed by processor 114 according to instructions stored on memory 116 of translation controller 110. Memory 116 may include a computer-readable storage medium or computer-readable storage device. In some examples, memory 116 may include one or more of a short-term memory or a long-term memory. Memory 116 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 114 may generate a structured description of a scene according to scene translation instructions 118 stored within one or more applications (e.g., software applications) stored in memory 116 of translation controller 110. Though only one memory 116 is depicted in translation controller 110 for purposes of clarity, in other examples, one or more memory devices included in each of translation controller 110, braille sequence printer 120, and/or camera 130 may store scene translation instructions 118 for different portions of a method regarding generating a structured description of a scene as described herein.

Translation controller 110 may receive one or more digital images from camera 130. For example, translation controller 110 may receive a single digital image as taken by a single photograph from camera 130, or translation controller 110 may receive a plurality of digital images as within a video recorded by camera 130. As depicted in FIG. 1, translation controller 110 may be housed within a separate housing than camera 130. For example, translation controller 110 may be a smart phone, while camera 130 is within a pair of smart glasses. Camera 130 may send a digital image to translation controller 110 using, e.g., near-field communication (NFC) or Bluetooth technology or the like. In other examples (not depicted), translation controller 110 and camera 130 may be integrated into a single device, such as a single pair of smart glasses or a walking cane or a smart phone or the like. Where translation controller 110 and camera 130 are within different structures, camera 130 may send translation controller 110 the digital image over network 140. Network 140 may include one or more private or public computing networks. For example, network 140 may comprise a private network (e.g., a network with a firewall that blocks non-authorized external access). Alternatively, or additionally, network 140 may comprise a public network, such as the Internet. In other embodiments, network 140 includes or is implemented as a short-range, wireless network (also referred to as a Personal Area Network). For example, network 140 can be configured according to Institute of Electrical and Electronics Engineers (IEEE) IEEE 802.15 standards. Example types of suitable personal area network technology include, but are not limited to, Infrared Data Association (IrDA), Wireless Universal Serial Bus (USB), Bluetooth or ZigBee. The translation controller 110 can communicate directly with the camera 130 and/or the Braille printer 120 over a personal area network in some embodiments. In other embodiments, a personal area network can be used to connect the translation controller 110 to a higher-level network, such as the internet, to enable communications between the translation controller 110 and the camera 130 and/or Braille printer 120. Although illustrated in FIG. 1 as a single entity, in other examples network 140 may comprise a combination of public and/or private networks.

In some examples, translation controller 110 may cause camera 130 to create the one or more digital images. For example, translation controller 110 may send a message over network 140 using interface 112 to camera 130. The message may be configured to cause camera 130 to immediately take a photograph or video and send the corresponding one or more digital images back to translation controller 110. Translation controller 110 may send this message to camera 130 in response to an instantiating prompt from a user regarding taking a photograph. For example, translation controller 110 may be voice-activated, such that a user may say "translate this scene into braille," in response to which translation controller 110 may be configured to send the message to camera 130. Alternatively, or additionally, translation controller 110 may be configured to send the message to camera 130 in response to a user pressing one or buttons or otherwise tactically interacting with a physical interface or surface of translation controller 110. Alternatively, or additionally, translation controller 110 may be configured to automatically (e.g., autonomously and without human input) cause camera 130 to take a photograph in response to detecting that the user is in a setting where a braille translation of the scene may be useful. For example, translation controller 110 may be configured to automatically cause camera 130 to take a photograph when translation controller 110 detects that the user is in a certain setting (e.g., in a mall, around vehicle traffic, or near sirens).

Scene translation instructions 118 stored in memory 116 of translation controller 110 may cause processor 114 to analyze the digital image once translation controller 110 receives the digital image. For example, translation controller 110 may be configured to utilize image recognition techniques such as, but not limited to, optical character recognition (OCR), image classification using neural networks and other types of pattern recognition. Using these techniques, translation controller 110 may detect primary features of digital image. In some examples, translation controller 110 may detect if one of a predetermined list of features as stored in memory 116 are captured within the digital image. For example, memory 116 may contain a list of a few dozen or hundred or thousand features for which translation controller 110 searches. This list may be editable by a user that is using translation controller 110, and/or the list may be editable by an admin that sets parameters through a software update or the like provided over network 140. Other means of updating a list of predetermined features are also possible.

Translation controller 110 may determine an overview of the scene of the digital image. An overview may be a general caption of the scene. For example, an overview may be "intersection in front of store fronts" or "check-out line at register in front of lunch menu" or "park with walkway around pond" or the like. In some examples, translation controller 110 may determine one of a predetermined set of overviews that are each stored in memory 116. In other examples, translation controller 110 may generate an overview as a natural language sentence or phrase that utilizes all or many of the features identified by translation controller 110. By combining identified features into a natural language overview, translation controller 110 may be configured to store and cause braille sequence printer 120 to convey relevant information of a scene in a compact and clear manner for a user.

Translation controller 110 may also identify additional details about some or each identified feature of the digital image. For example, for a feature of "lunch menu," translation controller 110 may identified additional details of "bacon cheeseburger $11" and "Caesar salad $7," while for a feature of "coffee shop" translation controller 110 may identify additional details of "open 6 am to 9 pm" and "Debbie's Neighborhood Coffee Shop." In some examples, translation controller 110 may store additional details and/or features in a natural language format in memory 116. For example, for the "coffee shop" feature, translation controller 110 may store the additional details as "Debbie's Neighborhood Coffee Shop is open from 6 am to 9 pm."

Translation controller 110 may generate the structured description of the scene using the overview, features, and details. For example, translation controller 110 may generate the structured description where the overview is created from the features and serves as a general title of the structured description, and details are linked (e.g., embedded) into respective features. Translation controller 110 may create an example structured description of:

```
{
    descriptionId: 'af527d',
    scene_overview: 'A city street with several shops. There is a person walking a dog, a café, a bookstore, and a clothing store.',
    feature_pointers: [
        {
            featureId: 'bxd426',
            featureName: 'person walking a dog',
            feature_details: 'A man of average height wearing a red shirt. The man holds a leash connected to a small white dog',
            token_offsets: { start: 9, end: 12}
        },
        {..., featureName: 'café', ...},
        {..., featureName: 'bookstore,' ...},
        {..., featureName: 'clothing store', ...},
}
```

Other examples of structured description are also possible.

Translation controller 110 may transmit the structured description to braille sequence printer 120. Translation controller 110 may transmit the structured description to braille sequence printer 120 over network 140. In some examples (not depicted), translation controller 110 and braille sequence printer 120 may be integrated into a single device, such that the structured description is transmitted, e.g., between modules of the single device.

Braille sequence printer 120 may be a device that is configured to generate braille text. For example, braille sequence printer 120 may use a plurality of pins or beads that extend from a surface to generate braille text. Braille sequence printer 120 may be integrated into a wearable apparatus, such as a glove or a sleeve or the like. Alternatively, braille sequence printer 120 may be integrated into a small portable device that can, e.g., fit into a pocket of a jacket or the like. For example, braille sequence printer 120 (and/or translation controller 110) may be configured to fit within a pocket of a jacket, such that a user may read the braille generated by braille sequence printer 120 and/or interact with braille sequence printer 120 and/or translation controller 110 (e.g., to get additional information regarding scene) with the use of a single hand that is interacting with braille sequence printer 120 and/or translation controller 110 within the pocket of a jacket. In this way, system 100 may enable a visually impaired user to discretely gather information on features or details of a scene of the user without drawing unwanted attention to the user.

In some examples, braille sequence printer 120 may be configured to provide haptic feedback. Further, braille sequence printer 120 may be configured to detect one or more user prompts, such as tactile prompts (e.g., the user pressing a button or pressing a location corresponding to one or more braille letters or words or phrases or pressing on the braille letters or numbers themselves), or verbal prompts (e.g., the user requesting to receive information on one of the features), or the like. For example, braille sequence printer 120 may be configured to use haptic feedback to indicate that different areas of braille sequence printer 120 may be used to provide respective prompts. Specifically, braille sequence printer 120 may include a glove that could be worn by the user on the non-dominant hand of the user, where the pins that form braille text are on the palm or the back of the hand (e.g., such that the user may read the braille text with the dominant hand of the user), where finger pads of braille sequence printer 120 glove can be "mapped" to various features of the structured description. For example, to continue the example above with the scene overview of the city street with several shops, an index finger pad may vibrate when the dominant hand traces the feature "person walking a dog," and a middle finger pad may vibrate when the dominant hand traces the feature "café," and a ring finger pad may vibrate when the dominant hand traces the feature "bookstore," and a pinky finger pad may vibrate when the dominant hand traces the feature "clothing store."

System 100 may detect when the user provides a prompt regarding the braille generated by the braille sequence printer 120. In some examples, translation controller 110 may detect the prompt provided by the user. In other examples, braille sequence printer 120 (e.g., using a processor similar to processor 114 of translation controller 110) may detect the prompt provided by the user without action by translation controller 110. Continuing the example of the haptic feedback finger pads described above, the finger pads may include pressure sensors with which braille sequence printer 120 may detect the user indicating the corresponding feature directly. For example, the user may request additional details on the feature "person walking a dog" by, e.g., pressing their thumb and index finger together twice in succession.

In response to a prompt from the user on one of the features, system 100 may provide additional details to the user via braille sequence printer 120 regarding the feature(s). For example, if the user requests additional details on one of the features, braille sequence printer 120 may generate additional braille text with the additional details. In some examples, translation controller 110 may determine the additional details to provide to the user via braille sequence printer 120. For example, where the user uses voice commands, translation controller 110 may detect the command and send a new request via network 140 to braille sequence printer 120 to generate the new braille text per the prompt. In other examples, braille sequence printer 120 may detect the prompt directly (e.g., without action by translation controller 110) and provide the new details to the user in response to the prompt.

Figure 2:
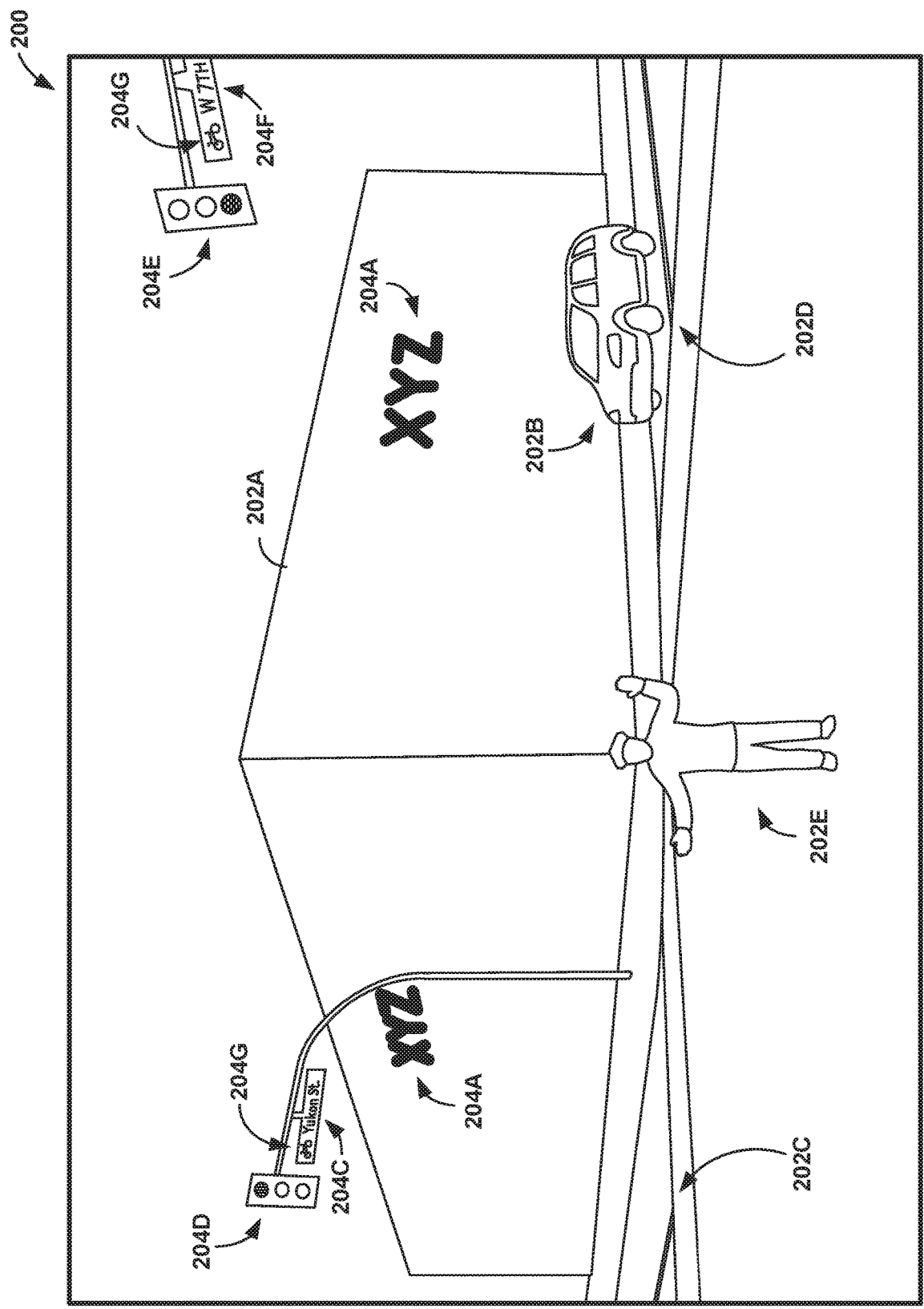
FIG. 2 depicts an example scene with a plurality of features and a plurality of details of the features.

FIG. 2 depicts an example scene 200 for which system 100 may generate a structured description. Translation controller 110 may determine that scene 200 includes a plurality of features 202A-202E (collectively "features 202") and a plurality of details 204A-204FG (collectively "details 204") about features 202. For example, translation controller 110 may determine that scene 200 includes store feature 202A, vehicle feature 202B, an intersection of two street features 202C, 202D, and a traffic cop feature 202E. Translation controller 110 may compile these features 202 into one natural language overview of "store at intersection of first and second street with traffic cop directing vehicle."

Translation controller 110 may determine a structured description as described above which may therein be transmitted to braille sequence printer 120, in response to which braille sequence printer 120 may generate braille text of the overview and/or each of features 202. The user may provide a follow up request for one or more features 202. For example, in response to the user providing a prompt for store feature 202A, braille sequence printer 120 may generate braille text with information such as XYZ store name detail 204A. For another example, in response to the user providing a prompt regarding first street 202C or second street 202D, braille sequence printer 120 may generate braille text with information such as West 7$^{th}$ Street detail 204F or Yukon Street detail 204C, respectively. For another example, in response to the user providing a prompt regarding the intersection, braille sequence printer 120 may generate braille text with information such as green light detail 204E for Yukon street detail 204C and/or red light detail 204D for W. 7$^{th}$ Street detail 204F. In some examples, translation controller 110 may access a remote data repository over network 140 (e.g., such as is available on the Internet) to obtain additional details 204 about features 202. For example, translation controller 110 may access GPS data (e.g., where translation controller 110 is integrated into a smart phone and/or otherwise has access to GPS data) or map data or the like the determine a direction of one or both streets. Using such information, translation controller 110 may integrate information gathered from scene 200 and from the online repository into a natural language phrase or sentence in response to a user prompt. For example, in response to a user prompt regarding the intersection, braille sequence printer 120 may generate braille text reading, "An intersection of North-South street Yukon Street and East-West street West 7$^{th}$ Street, where traffic on Yukon has a red light."

In some examples, a user may provide a prompt for details 204 that are not in structured description. For example, a user may inquire (e.g., with voice-activated functionality) regarding the operating hours of store feature 202A. Translation controller 110 may be unable to identify operating hours from scene 200, such that translation controller 110 may access an online data repository regarding store name detail 204A XYZ, in response to which translation controller 110 may identify such operating hours. Translation controller 110 may update structured description and transmit the updated structured description to braille sequence printer 120, such that the new detail (the operating hours) may be provided to the user.

For another example, a user may provide a prompt regarding details 204 that are in scene 200 but were not within structured description. For example, a user may provide a prompt regarding whether scene 200 includes bikes or information as to whether the streets are bike-friendly. In response to this, translation controller 110 may analyze scene 200 and determine that the street signs include bike-friendly indicator details 204G. Translation controller 110 may then update the structured description with this new detail 240G and then cause braille sequence printer 120 to generate braille text with this detail 204G. In some examples, where a user provides a prompt regarding a detail that is not referenced by structured description, system 100 may check scene prior to checking other data repositories.

In certain examples, translation controller 110 may not be able to determine the new detail 204G from the digital image of scene 200 that was used to create the initial structured description. For example, the digital image may not include the new detail 204G, or it may be out of focus, or out of frame, or the like. For example, in response to the bike-friendly request described above, translation controller 110 may determine that scene 200 includes vehicle feature 202B and does not include a bike, but that no other bike-related information is present with scene 200 as captured by the digital image. In this example, translation controller 110 may determine that the initial digital image included less than a threshold amount or a threshold quality of information on the request (e.g., such that system 100 may not provide a detail that is supported by a threshold amount or quality of information). For example, translation controller 110 may determine that translation controller 110 cannot update structured description in a manner that is responsive to the user inquiry with a confidence score greater than a threshold confidence score. In response to this, in some examples translation controller 110 may cause camera 130 to take a new photograph to capture a new digital image of scene 200. The new digital image may include the new detail 204G, in response to which translation controller 110 may update the structured description as described above.

In certain examples, the user may provide a prompt for one or more features 202 that are not in structured description. For example, translation controller 110 may have omitted details on traffic cop feature 202E (e.g., in response to a user-selected option to omit human features 202). However, the user may hear a whistle of a traffic cop and may want to ask the traffic cop a question. The user may therein ask if a traffic cop is in scene 200, and if so if there is a median that approaches the traffic cop, or the like. Translation controller 110 may detect this request and update the structured description with traffic cop feature 202E (e.g., and details 204 regarding a general location of the traffic cop), and braille sequence printer 120 may then generate braille on traffic cop feature 202E.

Figure 3:
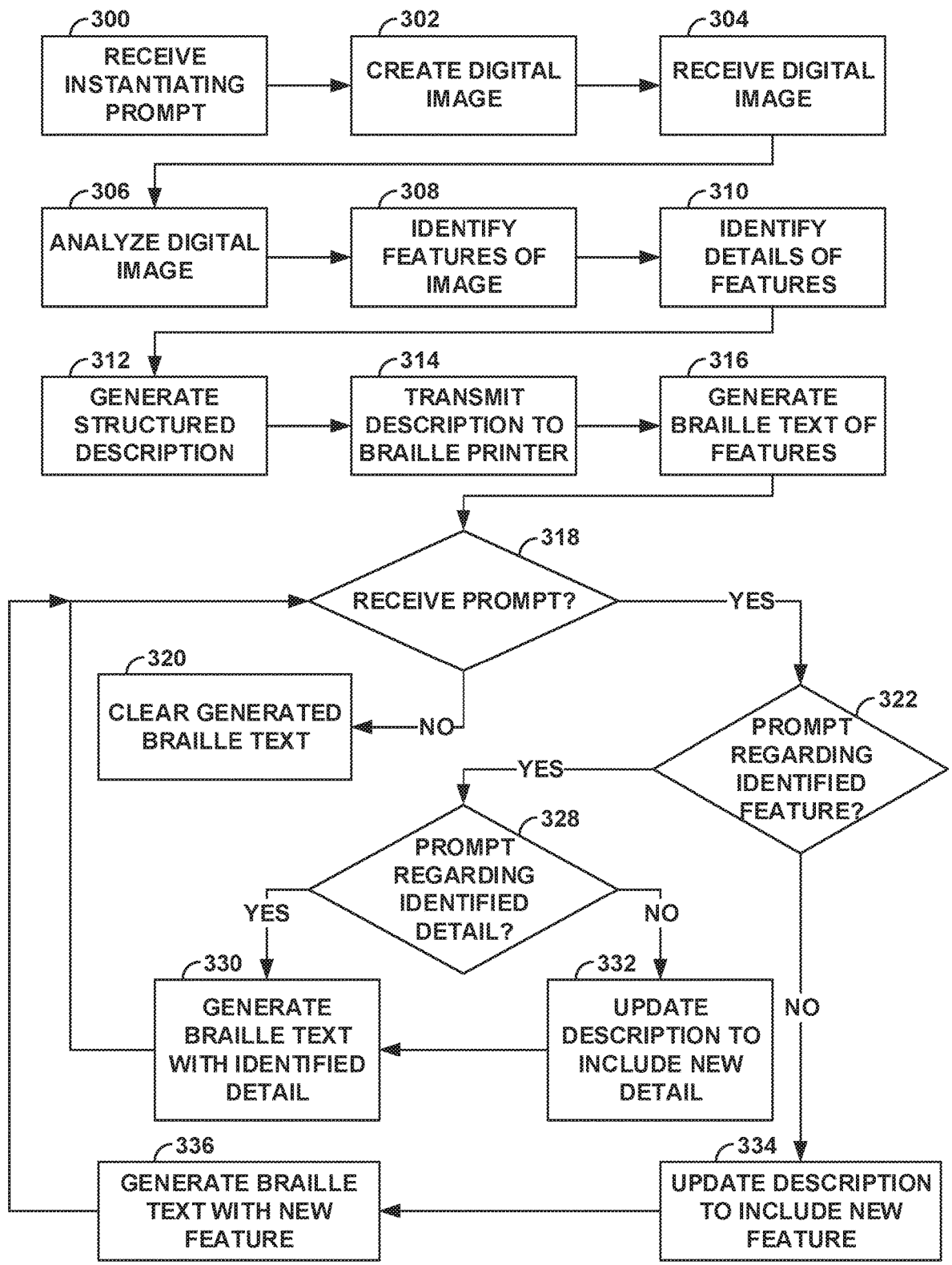
FIG. 3 depicts an example flowchart of a method of translating a scene to braille by creating a structured description of the scene.

FIG. 3 is a flowchart of a method of generating structured descriptions of a scene for translating the scene to braille. FIG. 3 is described with relation to system 100 of FIG. 1, though it is to be understood that the flowchart of FIG. 3 may be executed with different systems in different examples. Further system 100 may execute different methods of generating structured descriptions (e.g., methods with more or fewer operations, and/or similar operations executed in a different order) in other examples that are consistent with this disclosure. Where actions are attributed to translation controller 110, it is to be understood that in some examples processor 114 of translation controller 110 may be acting to execute steps of one or more sets of scene translation instructions 118 stored within memory 116 of translation controller 110.

Translation controller 110 may receive an instantiating prompt (300). Translation controller 110 may receive the instantiating prompt from a user or from an environmental actor (e.g., an emergency vehicle approaching translation controller 110) or the like. The instantiating prompt may direct system 100 to translate a scene (e.g., a scene that the user is currently facing) into braille. For example, a user may press a button or provide a verbal queue or the like. In response to the instantiating prompt, a digital image of the scene is captured (302). Camera 130 may capture the scene. Translation controller 110 may cause camera 130 to capture the scene. In some examples translation controller 110 is integrated with camera 130 such that both are within a single housing, though in other examples the two are integrated into separate housings. In certain examples, camera 130 may record a plurality of scenes, in response to which translation controller 110 may generate a plurality of structured descriptions as described herein. For example, camera 130 may send a video feed to translation controller 110, which may generate a real-time structured description of features and details and overview of the video feed. Specifically, a user may provide an instantiating prompt such as "tell me what shops I am passing" as the user walks around a mall in response to which translation controller 110 may create an ongoing structured description that predominantly or exclusively describes features related to the instantiating prompt.

Translation controller 110 may receive the one or more digital images (304). Translation controller 110 may receive the digital image from camera 130 as sent over network 140. Translation controller 110 may analyze the digital image (306). Analyzing the digital image may include utilizing optical character recognition and image recognition and pattern recognition and the like. Translation controller 110 may utilize neural networks or the like to analyze the digital image. Translation controller 110 may identify features (e.g., features 202 of FIG. 2) of the digital image (308). Features may include primary elements of the scene, such as elements that would be part of a primary caption of the scene. In certain examples, as described above, translation controller 110 may mainly or exclusively list features related to an instantiating prompt of user. In some examples, translation controller 110 may generate a caption or overview utilizing these features. For example, translation controller 110 may integrate all or most features into a natural language sentence or phrase to create an overview.

Translation controller 110 may identify details (e.g., details 204 of FIG. 2) of the features (310). Details as used herein may include information on the features as identified by translation controller 110. Translation controller 110 may analyze the digital image to identify the details. In some examples, translation controller 110 may utilize a data repository (e.g., over the Internet as accessed via network 140) to verify or identify or supplement some details.

Translation controller 110 may generate a structured description of the scene (312). The structured description may include the overview, the features, and the details as linked to the respective features (e.g., such that details are functionally embedded within respective features as stored in the structured description). Each of the overview, features, and details may be stored within the structured description in a natural language format. In some examples, each of the overview, features, and details may be stored in the structured description in an electronic braille format.

The structured description is transmitted to the braille sequence printer 120 (314). Where translation controller 110 is within a separate housing than braille sequence printer 120, the structured description may be transmitted over network 140. In other examples, translation controller 110 and braille sequence printer 120 may be integrated into a single structure (e.g., a wearable smart glove or sleeve that is configured to communicate with camera 130 via network 140) such that the structured description is transmitted between modules or other internal components of a single device.

Braille sequence printer 120 generates a braille text of features using the structured description (316). In some examples, braille sequence printer 120 generates the braille text of the features in a natural language format using the overview. Braille sequence printer 120 may generate the overview of features by physically raising a series of pins that correspond to the respective braille text.

System 100 may determine if the user sends a prompt (318). A prompt may include information regarding features or details of the scene. Both braille sequence printer 120 and/or translation controller 110 may determine if the user sends a prompt. A prompt may include tactile feedback as described herein, a voice command, or the like. After a predetermined event, system 100 may cause braille sequence printer 120 to clear the generated braille text (320).

For example, system 100 may cause the braille text to clear in response to system 100 determining that no prompt is sent by the user, or after a predetermined amount of time without a prompt, or in response to an affirmative prompt from the user to clear the text, or the like. Where system 100 determines that a prompt was received, system 100 may determine whether the prompt relates to a feature of the scene that was identified by translation controller 110 (322). For example, a user may "double press" a finger pad of the braille sequence printer 120 that corresponds to a feature of the structured description as described above to provide a prompt about an identified feature. For another example, a user may use voice commands to audibly ask about a possible feature of the scene that was not provided by braille sequence printer 120 (e.g., as a result of translation controller 110 not including the possible feature in the structured description).

Where system 100 determines that the prompt was regarding a feature that was not in the structured description (and therein was not generated by the braille sequence printer 120), translation controller 110 may update the structured description to include or otherwise reference the new feature (334). For example, translation controller 110 may analyze the initial digital image, take a new digital image, and/or access a data repository for information on the new feature. Where translation controller 110 finds information on the new feature, translation controller 110 may update the structured description to include this affirmative information and/or any additional details on the new feature. Alternatively, where translation controller 110 is not able to identify or gather any information on the new feature, translation controller 110 may update the structured description to affirmatively list the absence of such information. For example, regarding scene 200 described above, if the user provided a prompt asking if any pedestrians were present, translation controller 110 may analyze the digital image and/or take a new digital image of scene 200 and therein conclude that no pedestrians were present and update the structured description accordingly.

Once updated, translation controller 110 may again transmit the updated structured description to braille sequence printer 120 in response to which braille sequence printer 120 may generate braille text with the updated structured description (336). Once the braille text is generated, the translation controller 110 may again wait and/or determine if a new prompt is received as described above.

In some examples, where system 100 determines that a prompt is received (318) and that the prompt regards an identified feature (322), system may identify whether the prompt is regarding an identified detail (328). For example, system 100 may transmit a prompt regarding details for a given feature, such that if any such details are known braille sequence printer 120 may generate these details for the user (330). In other examples, system 100 may determine that the user is providing a prompt about one or more details that are not included in the structured description.

For example, translation controller 110 may determine that the user sent a voice prompt about a detail that was not included in the structured description. Alternatively, translation controller 110 may identify a received user prompt about additional details for a feature for which no additional details exists. In such examples, translation controller 110 may update the structured description to include such details (332). For example, translation controller 110 may generate a new detail with new information in response to the prompt, or translation controller 110 may update the details to explicitly and affirmatively state that no information exists regarding the prompt. In response to this, braille sequence printer 120 may generate the braille text with the new identified detail (330) and system 100 may wait to determine if there is a new prompt (318).

As described above, in some examples camera 130 may provide a real-time feed of digital images to translation controller 110, in response to which most or each of the operations of the flowchart of FIG. 3 may be executed in real-time as a scene of the user changes. For example, as mentioned above, a user may request for the scene of shops to be translated to braille for the user (300), in response to which camera 130 may record a live feed (302) which is periodically or continually sent to translation controller 110 (304), where features of store names may be identified (308) (as well as the identification (310) of details of relative locations of the stores) such that a real-time structured description may be generated (312). This real-time structured description may be periodically or continually transmitted to braille sequence printer 120 (314) such that a user may, e.g., walk around a mall and receive a real-time feed from the continually-refreshing braille text generated (316) by braille sequence printer 120 to indicate stores that the user is walking past. A user may further occasionally interact with system 100 by providing further prompts (322-336) to system 100 to inquire further about the updating scene around user.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

receiving, by a processor, a digital image of a scene;

generating, by the processor, a structured description of the scene utilizing image recognition techniques on the digital image, wherein the structured description includes:

a natural language phrase that describes the scene using at least a first feature and a second feature of the scene such that the first feature is a first pointer and the second feature is a second pointer within the natural language phrase;

a first detail of the first feature stored in a natural language format and embedded in the structured description via the first pointer; and a second detail of the second feature stored in a natural language format and embedded in the structured description via the second pointer;

transmitting the structured description to a portable braille sequence printer;

generating, by the portable braille sequence printer and using the structured description, braille text of the natural language phrase; and generating, by the portable braille sequence printer and subsequent to generating the braille text, additional braille text regarding the first detail.

2. The method of claim 1, wherein the portable braille sequence printer is wearable.

3. The method of claim 1, further comprising:

receiving, by the processor, an instantiating prompt to create the structured description of the scene; and causing, by the processor, a camera to create the digital image in response to the instantiating prompt.

4. The method of claim 1, wherein the additional text is generated in response to a prompt from a user regarding the first feature of the natural language phrase, further comprising:
- receiving, from the user, a second prompt regarding an additional detail of the first feature;
- generating, by the processor, an updated structured description of the scene utilizing image recognition techniques on the digital image, wherein the updated structured description includes the additional detail of the first feature; and
- generating, by the portable braille sequence printer and in response to receiving the second prompt, braille text of the additional detail.

5. The method of claim 1, wherein the additional text is generated in response to a prompt from a user regarding the first feature of the natural language phrase further comprising:
- receiving, from the user, a second prompt regarding an additional detail of the first feature;
- determining, by the processor utilizing image recognition techniques, that the digital image includes less than a threshold amount of information regarding the additional detail;
- causing, by the processor and in response to determining that the digital image includes less than the threshold amount of information, a camera to create an additional digital image of the scene;
- generating, by the processor, an updated structured description of the scene utilizing image recognition techniques on the additional digital image, wherein the updated structured description includes the additional detail of the first feature; and
- generating, by the portable braille sequence printer and in response to receiving the second prompt, braille text of the additional detail.

6. The method of claim 1, wherein the structured description includes an overview of the scene that is a natural language sentence that includes both the first and the second feature, wherein the portable braille sequence printer generating the braille text of the first and second features includes the portable braille sequence printer generating the overview.

7. The method of claim 1, wherein the additional text is generated in response to a prompt from a user regarding the first feature of the natural language phrase, further comprising:
- receiving, from the user, a second prompt regarding a third feature of the scene;
- generating, by the processor, an updated structured description of the scene utilizing image recognition techniques on the digital image, wherein the updated structured description includes the third feature and a third detail about the third feature; and
- generating, by the portable braille sequence printer and in response to receiving the second prompt, braille text of the third feature.

8. The method of claim 1, wherein the additional text is generated in response to a prompt from a user regarding the first feature of the natural language phrase, further comprising:
- receiving, from the user, a second prompt regarding an additional detail of the first feature;
- determining, by the processor utilizing image recognition techniques, that the digital image includes less than a threshold amount of information regarding the additional detail;
- gathering, by the processor and in response to determining that the digital image includes less than the threshold amount of information, the additional detail from a data repository;
- generating, by the processor, an updated structured description of the scene utilizing image recognition techniques on the additional digital image, wherein the updated structured description includes the additional detail of the first feature; and
- generating, by the portable braille sequence printer and in response to receiving the second prompt, braille text of the additional detail.

9. The method of claim 1, wherein the structured description includes text stored in an electronic braille format.

10. The method of claim 1, wherein the portable braille sequence printer generates additional braille text regarding the first detail using the structured description without analyzing the scene.

* * * * *